United States Patent
Yoon et al.

(10) Patent No.: US 9,988,310 B2
(45) Date of Patent: Jun. 5, 2018

(54) DIELECTRIC CERAMIC COMPOSITION, MULTILAYER CERAMIC CAPACITOR CONTAINING THE SAME, AND METHOD FOR MANUFACTURING MULTILAYER CERAMIC CAPACITOR

(71) Applicant: SAMSUNG ELECTRO-MECHANICS CO., LTD., Suwon-si, Gyeonggi-do (KR)

(72) Inventors: Seok Hyun Yoon, Suwon-si (KR); Seung Ho Lee, Suwon-si (KR); Jung Wook Seo, Suwon-si (KR); Song Je Jeon, Suwon-si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days. days.

(21) Appl. No.: 15/284,577

(22) Filed: Oct. 4, 2016

(65) Prior Publication Data
US 2017/0190626 A1    Jul. 6, 2017

(30) Foreign Application Priority Data
Jan. 5, 2016 (KR) .................. 10-2016-0000827

(51) Int. Cl.
| | |
|---|---|
| *C04B 35/468* | (2006.01) |
| *H01G 4/12* | (2006.01) |
| *H01G 4/30* | (2006.01) |

(52) U.S. Cl.
CPC ...... *C04B 35/4686* (2013.01); *C04B 35/4682* (2013.01); *H01G 4/1227* (2013.01); *H01G 4/30* (2013.01); *C04B 2235/3206* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3239* (2013.01); *C04B 2235/3241* (2013.01); *C04B 2235/3267* (2013.01); *C04B 2235/3272* (2013.01);
(Continued)

(58) Field of Classification Search
CPC ............ C04B 35/4682; C04B 35/4686; H01G 4/1227
See application file for complete search history.

(56) References Cited

U.S. PATENT DOCUMENTS

| | | | |
|---|---|---|---|
| 2007/0191540 A1 | 8/2007 | Nunoshige et al. | |
| 2007/0202036 A1* | 8/2007 | Jongen ................ | B82Y 30/00 423/593.1 |
| 2015/0109094 A1 | 4/2015 | Shimada et al. | |

FOREIGN PATENT DOCUMENTS

| | | |
|---|---|---|
| JP | 2004-210601 A | 7/2004 |
| JP | 2007-211201 A | 8/2007 |
| JP | 2008195555 * | 8/2008 |

* cited by examiner

*Primary Examiner* — Karl E Group
(74) *Attorney, Agent, or Firm* — McDermott Will & Emery LLP

(57) ABSTRACT

A dielectric ceramic composition contains a first main ingredient of $BaTiO_3$ and a second main ingredient of $BaTi_2O_5$, and a base material powder containing the first and second main ingredients is represented by $(1-x)BaTiO_3-xBaTi_2O_5$ and x satisfies $0.1 \leq x \leq 0.8$. The dielectric ceramic composition may include additional accessory ingredients, and may be used to form ceramic sheets having internal electrodes of a multilayer ceramic capacitor disposed thereon.

23 Claims, 3 Drawing Sheets

(52) U.S. Cl.
CPC ............... *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/5445* (2013.01); *C04B 2235/6582* (2013.01); *C04B 2235/79* (2013.01); *C04B 2235/80* (2013.01)

DIELECTRIC CERAMIC COMPOSITION, MULTILAYER CERAMIC CAPACITOR CONTAINING THE SAME, AND METHOD FOR MANUFACTURING MULTILAYER CERAMIC CAPACITOR

CROSS-REFERENCE TO RELATED APPLICATION(S)

This application claims benefit of priority to Korean Patent Application No. 10-2016-0000827 filed on Jan. 5, 2016 in the Korean Intellectual Property Office, the disclosure of which is incorporated herein by reference in its entirety.

BACKGROUND

1. Field

The present disclosure relates to a dielectric ceramic composition capable of ensuring X8R or X9S temperature characteristics and reliability, a multilayer ceramic capacitor containing the same, and a method for manufacturing a multilayer ceramic capacitor.

2. Description of Related Art

In general, electronic components using a ceramic material, such as capacitors, inductors, piezoelectric elements, varistors, or thermistors, and the like, include a ceramic body formed of the ceramic material, internal electrodes formed in the ceramic body, and external electrodes installed on a surface or surfaces of the ceramic body to be connected to the internal electrodes.

Among ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

Multilayer ceramic capacitors are widely used as components in mobile communications devices such as computers, personal digital assistants (PDAs), mobile phones, or the like, due to advantages thereof such as a small size, high capacitance, ease of mounting, and the like.

In general, a multilayer ceramic capacitor is manufactured by stacking layers of a conductive paste used for forming an internal electrode and a paste used for forming a dielectric layer using a sheet method, a printing method, or the like, and simultaneously sintering the stacked layers of paste.

Recently, with the increase in use of electronic control devices in vehicles and the development of hybrid vehicles and electric vehicles, demand for multilayer ceramic capacitors capable of being used at high temperatures of 150° C. or more has gradually increased.

Currently, as a dielectric material capable of being sintered under a reduction atmosphere and being applied to a product capable of ensuring characteristics up to 200° C., there is provided a COG-based dielectric material, but permittivity thereof is 30 or so, significantly low, such that it is difficult to manufacture a high capacitance product.

In a case of $BaTiO_3$, permittivity is high (1000 or more), but the permittivity is rapidly decreased at a Curie temperature of 125° C. or more, such that it is impossible to maintain device characteristics up to 200° C., higher than 150° C.

In order to increase the Curie temperature of $BaTiO_3$, a method for solid-dissolving Pb in a Ba-site is used, but Pb is classified as a material subject to environmental regulations, such that there is a large limitation in using Pb.

In addition, it is known that materials such as $Bi(Mg_{0.5}Ti_{0.5})O_3$, $(Bi_{0.5}Na_{0.5})TiO_3$, $Bi(Zn_{0.5}Ti_{0.5})O_3$, $BiScO_3$, and the like, perovskite materials containing a $BaTiO_3$ material and Bi, may provide stable permittivity at a high temperature while increasing a Curie temperature, but these materials may only be sintered under an air atmosphere.

That is, in a case of manufacturing a multilayer ceramic capacitor including Ni internal electrodes using materials such as $Bi(Mg_{0.5}Ti_{0.5})O_3$, $(Bi_{0.5}Na_{0.5})TiO_3$, $Bi(Zn_{0.5}Ti_{0.5})O_3$, $BiScO_3$, and the like, at the time of sintering under a reduction atmosphere, insulation resistance is rapidly decreased, such that it is difficult to use these materials.

As a dielectric material of a high-temperature capacitor capable of being sintered under a reduction atmosphere, Na(Nb, Ta) $O_3$ has been used. However, since Nb and Ta (starting materials of $Na(Nb,Ta)O_3$) are expensive, costs of Nb and Ta account for a large portion of material costs at the time of mass-production, and insulation resistance characteristics may be deteriorated as compared to $BaTiO_3$.

In addition, $BaTi_2O_5$, is known to have a Curie temperature of about 500° C., but $BaTi_2O_5$ also has problems in that $BaTi_2O_5$ may only be sintered under an air atmosphere, and reduction resistance and insulation resistance may be deteriorated.

Therefore, there is a need to develop a dielectric material capable of implementing normal insulation resistance while having a Curie temperature higher than that of $BaTiO_3$, even in a case of being sintered under a reduction atmosphere.

SUMMARY

An aspect of the present disclosure provides a dielectric ceramic composition capable of providing normal insulation resistance while having a Curie temperature higher than that of $BaTiO_3$ even in a case of being sintered at a reduction atmosphere. The disclosure further provides a multilayer ceramic capacitor containing the same, and a method for manufacturing a multilayer ceramic capacitor.

An aspect of the present disclosure also provides a dielectric ceramic composition capable of being sintered at a reduction atmosphere and simultaneously having characteristics such as high permittivity, high insulation resistance, and a high Curie temperature. The disclosure further provides a multilayer ceramic capacitor containing the same, and a method for manufacturing a multilayer ceramic capacitor.

According to an aspect of the present disclosure, a dielectric ceramic composition may contain a first main ingredient of $BaTiO_3$ and a second main ingredient of $BaTi_2O_5$. A base material powder which contains the first and second main ingredients is represented by $(1-x)BaTiO_3-xBaTi_2O_5$, where x satisfies $0.1 \leq x \leq 0.8$.

According to another aspect of the present disclosure, a multilayer ceramic capacitor may include a ceramic body including dielectric layers and internal electrodes, and external electrodes disposed on an outer portion of the ceramic body and connected to the internal electrodes. The dielectric layers include a first crystal grain and a second crystal grain, the first crystal grain being a crystal grain in which a Ti/Ba content ratio is less than 1.5), the second crystal grain being a crystal grain in which a Ti/Ba content ratio is 1.5 to 2.5, and an area ratio of the second crystal grain to a total area is 9.5% to 81.4%.

According to another aspect of the present disclosure, a method for manufacturing a multilayer ceramic capacitor may include manufacturing a plurality of ceramic sheets using a base material powder containing a first main ingredient of $BaTiO_3$ and a second main ingredient of $BaTi_2O_5$. An internal electrode is printed on two or more of the ceramic sheets using a conductive paste, and the ceramic sheets are stacked and compressed to manufacture a compressed bar. The compressed bar is cut to manufacture a chip, and the chip is sintered under a reduction atmosphere. The base material powder is represented by $(1-x)BaTiO_3-xBaTi_2O_5$, where x satisfies $0.1 \leq x \leq 0.8$.

According to a further aspect of the present disclosure, dielectric ceramic composition can include a first crystal grain in which a Ti/Ba content ratio is less than 1.5, and a second crystal grain in which a Ti/Ba content ratio is 1.5 to 2.5, where an area ratio of the second crystal grain to a total area is 9.5% to 81.4%.

According to another aspect of the present disclosure, a multilayer ceramic capacitor can include a ceramic body including dielectric layers and internal electrodes, and external electrodes disposed on an outer portion of the ceramic body and connected to the internal electrodes. The dielectric layers include a base material powder containing a first main ingredient of $BaTiO_3$ and a second main ingredient of $BaTi_2O_5$, the base material powder is represented by $(1-x)BaTiO_3-xBaTi_2O_5$, and x satisfies $0.1 \leq x \leq 0.8$

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
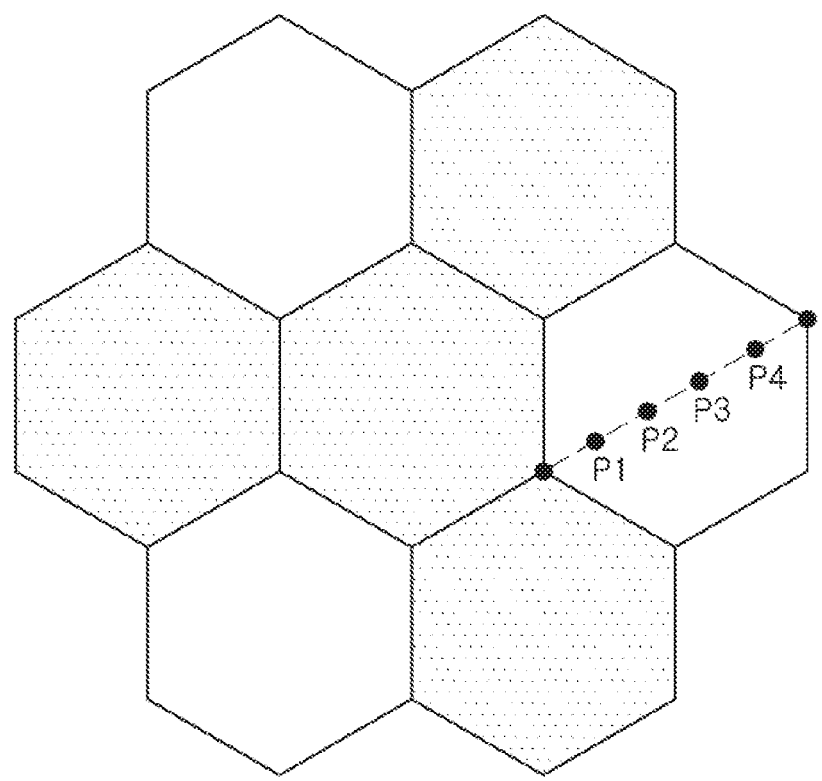
FIG. 1 is a schematic view illustrating a microstructure composed of a first crystal grain and a second crystal grain as may be used in the dielectric ceramic compositions discussed herein.

Exemplary embodiments of the present disclosure will now be described in detail with reference to the accompanying drawings.

The present disclosure relates to a dielectric ceramic composition. Examples of electronic components containing the dielectric ceramic composition include capacitors, inductors, piezoelectric elements, varistors, thermistors, or the like. Hereinafter, the dielectric ceramic composition and a multilayer ceramic capacitor as an example of the electronic component will be described.

In the present disclosure, a content of each accessory ingredient of the dielectric ceramic composition may be represented by the number of moles or at % of each accessory ingredient based on 100 mol of a base material powder.

In describing the content of the accessory ingredient in the present disclosure, at % may mean a percentage value of the number of desired atoms of each accessory ingredient with respect to the number of Ba atoms contained in 1 mol of the base material powder.

The desired atoms may mean a variable valence acceptor atom, a fixed-valence acceptor atom, a rare earth metal atom, and the like.

A dielectric ceramic composition according to an exemplary embodiment may contain a first main ingredient of $BaTiO_3$ and a second main ingredient of $BaTi_2O_5$, wherein a base material powder containing the first and second main ingredients is represented by $(1-x)BaTiO_3-xBaTi_2O_5$, and x satisfies $0.1 \leq x \leq 0.8$.

The dielectric ceramic composition according to the exemplary embodiment in the present disclosure may satisfy the X8R ($-55°$ C.$\sim 150°$ C., $\Delta C/C0 \pm 15\%$) or X9S ($-55°$ C.$\sim 200°$ C., $\Delta C/C0 \pm 22\%$) characteristics specified by the Electronic Industries Association (EIA) standard.

In more detail, according to the exemplary embodiment, there is provided a dielectric ceramic composition capable of using Ni as a material of the internal electrodes and maintaining insulation resistance even in a case in which the dielectric ceramic composition is sintered under a reduction atmosphere at which Ni is not oxidized.

Further, the present disclosure may provide a multilayer ceramic capacitor using the dielectric ceramic composition, such that characteristics such as high permittivity, high insulation resistance, and a high Curie temperature may be simultaneously implemented.

Particularly, the desired characteristics of the present disclosure may be implemented by using the dielectric ceramic composition capable of containing $BaTiO_3$ having high permittivity and $BaTi_2O_5$ having a high Curie temperature and being sintered under a reduction atmosphere to prepare a sample in a form of a composite composed of two kinds of crystal grains having different compositions from each other in a single sintered body, and controlling an area ratio between these two crystal grains.

Hereinafter, each ingredient of the dielectric ceramic composition according to the exemplary embodiment will be described in more detail.

a) Base Material Powder

The dielectric ceramic composition according to the exemplary embodiment may contain the first main ingredient of $BaTiO_3$ and the second main ingredient of $BaTi_2O_5$, wherein the base material powder containing the first and second main ingredients is represented by $(1-x)BaTiO_3-xBaTi_2O_5$, and x satisfies $0.1 \leq x \leq 0.8$.

The first main ingredient may be represented by $BaTiO_3$, wherein $BaTiO_3$, a material used in a general dielectric base material, may be a ferroelectric material having a Curie temperature of about 125° C. or so.

As the first main ingredient, ingredients such as $(Ba_{1-x}Ca_x)(Ti_{1-y}Ca_y)O_3$, $Ba(Ti_{1-y}Zr_y)O_3$ in which Ca, Zr, or the like is partially solid-dissolved, or the like, in addition to the ingredient of $BaTiO_3$ may also be used.

The second main ingredient may be represented by $BaTi_2O_5$.

That is, in the base material powder of the dielectric ceramic composition according to the exemplary embodiment, materials represented by $BaTiO_3$ having high permittivity and $BaTi_2O_5$ having a high Curie temperature may be mixed with each other in a predetermined ratio.

Since the dielectric ceramic composition according to the exemplary embodiment uses the base material powder prepared by mixing the first and second main ingredients at a predetermined ratio as described above, the dielectric ceramic composition may be sintered under the reduction atmosphere.

FIG. 1 is a schematic view illustrating a microstructure composed of a first crystal grain and a second crystal grain, and positions P1, P2, P3, and P4 for analyzing contents of Ba and Ti in each crystal grain by scanning transmission electron microscopy (STEM)/wavelength dispersive X-ray spectroscopy (WDS) or STEM/electron energy loss spectroscopy (EELS).

Referring to FIG. 1, a microstructure of a dielectric layer manufactured using the dielectric ceramic composition according to the exemplary embodiment (under the reduction atmosphere at a sintering temperature of 1200° C.) may include a first crystal grain in which a Ti/Ba content ratio is less than 1.5 and a second crystal grain in which the Ti/Ba content ratio is 1.5 to 2.5.

Contents of Ti and Ba in a single crystal grain may be obtained by measuring contents (at %) of Ti and Ba at each of the points P1 to P4 and calculating average values of the measured contents at the four positions.

A dielectric layer and a multilayer ceramic capacitor using the dielectric ceramic composition according to the exemplary embodiment may simultaneously have the characteristics such as high permittivity, high insulation resistance, and high Curie temperature.

More specifically, since in the dielectric layer manufactured using the dielectric ceramic composition according to the exemplary embodiment and a multilayer ceramic capacitor including the dielectric layers, an area ratio of the second crystal grain to a total area is 9.5 to 81.4%, all of the desired characteristics of the present disclosure, that is room-temperature specific resistance of 1E11 Ohm-cm or more, high-temperature (200° C.) withstand voltage of 50V/μm or more, and room-temperature permittivity of 150 or more, may be simultaneously provided.

Further, since in the dielectric layer manufactured using the dielectric ceramic composition according to the exemplary embodiment and a multilayer ceramic capacitor including the dielectric layers, the area ratio of the second crystal grain to the total area is 9.5 to 81.4%, the X8R (−55° C.~150° C., ΔC/C0±15%) or X9S (−55° C.~200° C., ΔC/C0±22%) characteristics specified by the Electronic Industries Association (EIA) standard may be satisfied.

In a case in which the area ratio of the second crystal grain to the total area is less than 9.5%, the X8R (−55° C.~150° C., ΔC/C0±15%) or X9S (−55° C.~200° C., ΔC/C0±22%) characteristics specified by the Electronic Industries Association (EIA) standard may not be satisfied. Furthermore, in a case in which the area ratio of the second crystal grain to the total area is more than 81.4%, room-temperature permittivity may be less than 150.

That is, in a case in which the area ratio of the second crystal grain to the total area is out of the range of 9.5% to 81.4%, the desired characteristics of the present disclosure may not be provided.

The base material powder is not particularly limited, but may have an average particle size of 300 nm or less.

b) First Accessory Ingredient

According to the exemplary embodiment, the dielectric ceramic composition may further contain an oxide or carbonate containing one of Manganese (Mn), vanadium (V), chromium (Cr), iron (Fe), nickel (Ni), cobalt (Co), copper (Cu), and zinc (Zn), as a first accessory ingredient. For example, the first accessory ingredient may be $MnO_2$ or $V_2O_5$.

Here, Mn, V, Cr, Fe, Ni, Co, Cu, and Zn are variable valence acceptors.

The first accessory ingredient may be provided in a ratio of 0.2 mol to 5.0 mol based on 100 mol of the base material powder. Alternatively, the first accessory ingredient may be provided so that a sum of contents of one or more atoms selected among Mn, V, Cr, Fe, Ni, Co, Cu, and Zn, contained in the first accessory ingredient, is in a range of 0.2 at % to 5.0 at %.

The first accessory ingredient may serve to decrease a sintering temperature of a multilayer ceramic capacitor using the dielectric ceramic composition, and improve high-temperature withstand voltage characteristics.

In a case in which the content of the first accessory ingredient is less than 0.2 mol based on 100 mol of the base material powder, high-temperature withstand voltage characteristics may be deteriorated, and in a case in which the content of the first accessory ingredient is more than 5.0 mol based on 100 mol of the base material powder, high-temperature withstand voltage characteristics may also be deteriorated.

That is, the dielectric ceramic composition according to the exemplary embodiment may further contain the first accessory ingredient in a content of 0.2 mol to 5.0 mol, such that all of the desired characteristics, that is room-temperature specific resistance of 1E11 Ohm-cm or more, high-temperature (200° C.) withstand voltage of 50V/μm or more, temperature coefficient of capacitance (TCC) (at 150° C.) less than ±15%, TCC (at 200° C.) less than ±22%, and room-temperature permittivity of 150 or more, may be simultaneously provided.

In this case, the area ratio of the second crystal grain to the total area may also be 9.5% to 81.4%, as described below.

c) Second Accessory Ingredient

According to the exemplary embodiment, the dielectric ceramic composition may contain a second accessory ingredient containing one or more selected from the group consisting of oxides and carbonates of Ba. For example, the second accessory ingredient may be $BaCO_3$.

The second accessory ingredient may be provided in a ratio of 0.2 mol to 10.0 mol based on 100 mol of the base material powder.

In a case in which the second accessory ingredient is not added or is excessively added, a sintering density may be decreased, such that the high-temperature withstand voltage may be decreased to be less than 50V/μm.

In a case in which the second accessory ingredient is provided in a ratio of 0.2 mol to 10.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, may be simultaneously provided.

In this case, the area ratio of the second crystal grain to the total area may also be 9.5% to 81.4%, as described below.

d) Third Accessory Ingredient

According to the exemplary embodiment, the dielectric ceramic composition may contain a third accessory ingredient containing one or more selected from the group consisting of oxides of Si, carbonates of Si, and glass containing Si.

The third accessory ingredient may be provided in a ratio of 0.2 mol to 5.0 mol based on 100 mol of the base material powder.

In a case in which the content of the third accessory ingredient is less than 0.2 mol based on 100 mol of the base material powder of the dielectric ceramic composition, the high-temperature withstand voltage may be decreased due to a low sintering density. Furthermore, in a case in which the content is more than 5.0 mol, the high-temperature withstand voltage may be decreased due to formation of a secondary phase.

In a case in which the third accessory ingredient is provided in a ratio of 0.2 mol to 5.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, may be simultaneously provided.

In this case, the area ratio of the second crystal grain to the total area may also be 9.5% to 81.4%, as described below.

e) Fourth Accessory Ingredient

According to the exemplary embodiment, the dielectric ceramic composition may further contain an oxide or carbonate containing at least one of yttrium (Y), dysprosium (Dy), lanthanum (La), cerium (Ce), neodymium (Nd), samarium (Sm) gadolinium (Gd) and erbium (Er), as a fourth accessory ingredient.

The fourth accessory ingredient may be provided in a ratio of 0.25 mol to 5.0 mol based on 100 mol of the base material powder.

Alternatively, the fourth accessory ingredient may be provided in the dielectric ceramic composition so that a sum of contents of one or more atoms selected among Y, Dy, Ho, La, Ce, Nd, Sm, Gd, and Er, contained in the fourth accessory ingredient is in a ratio of 0.5 at % to 10.0 at %.

According to the exemplary embodiment, the fourth accessory ingredient may serve to prevent deterioration of the reliability of the multilayer ceramic capacitor to which the dielectric ceramic composition is applied, and in a case in which the fourth accessory ingredient is provided in a ratio of 0.25 mol to 5.0 mol based on 100 mol of the base material powder, a dielectric ceramic composition capable of implementing high permittivity and having excellent high-temperature withstand voltage characteristics may be provided.

In a case in which the dielectric ceramic composition contains the fourth accessory ingredient, high-temperature withstand voltage characteristics may be improved as compared to a case in which the dielectric ceramic composition does not contain the fourth accessory ingredient. In a case in which the content of the fourth accessory ingredient is more than 5.0 mol based on 100 mol of the base material powder, the high-temperature withstand voltage may be decreased due to formation of a secondary phase.

In a case in which the fourth accessory ingredient is provided in a ratio of 0.25 mol to 5.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, may be simultaneously implemented.

In this case, the area ratio of the second crystal grain to the total area may also be 9.5% to 81.4%, as described below.

f) Fifth Accessory Ingredient

According to the exemplary embodiment, the dielectric ceramic composition may contain one or more of an oxide and a carbonate of a fixed-valence acceptor element including Mg as a fifth accessory ingredient. For example, the fifth accessory ingredient may be $MgCO_3$.

The fifth accessory ingredient may be provided in a ratio of 0.5 mol to 5.0 mol based on 100 mol of the base material powder.

In a case in which the dielectric ceramic composition contains $MgCO_3$ as the fifth accessory ingredient, a room-temperature specific resistance value may be increased as compared to a case in which the dielectric ceramic composition does not contain $MgCO_3$. In a case in which the content of the fifth accessory ingredient is more than 5.0 mol based on 100 mol of the base material powder, the high-temperature withstand voltage may be decreased due to formation of a secondary phase.

That is, in a case in which the fifth accessory ingredient is contained in a ratio of 0.5 mol to 5.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, may be simultaneously provided.

In this case, the area ratio of the second crystal grain to the total area may also be 9.5% to 81.4%, as described below.

Figure 2:
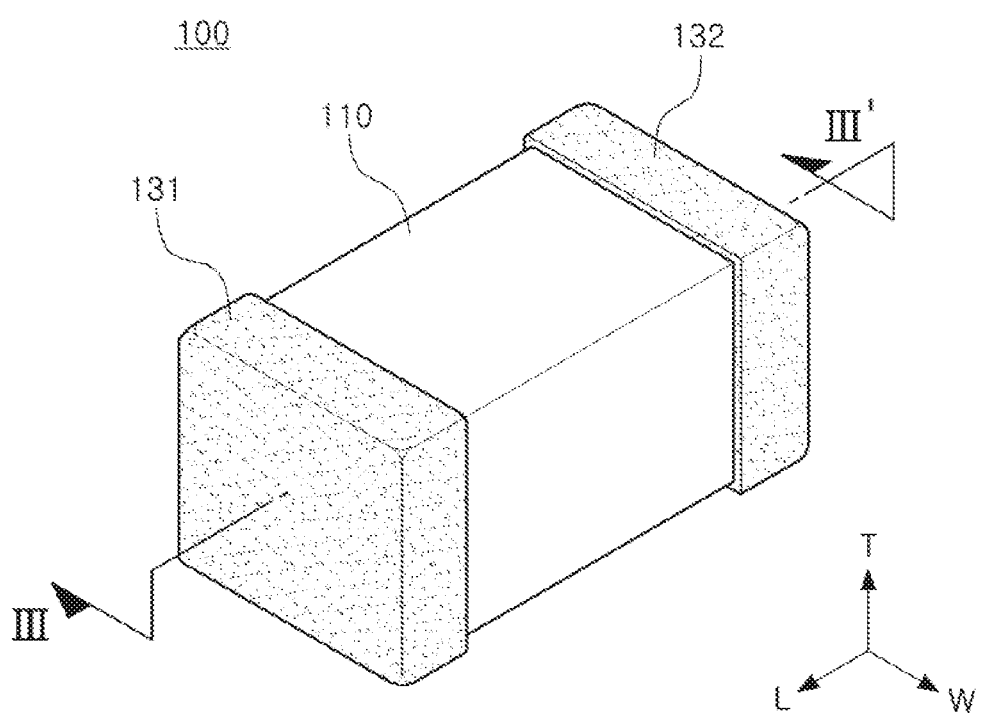
FIG. 2 is a schematic perspective view illustrating a multilayer ceramic capacitor according to an exemplary embodiment.
Figure 3:
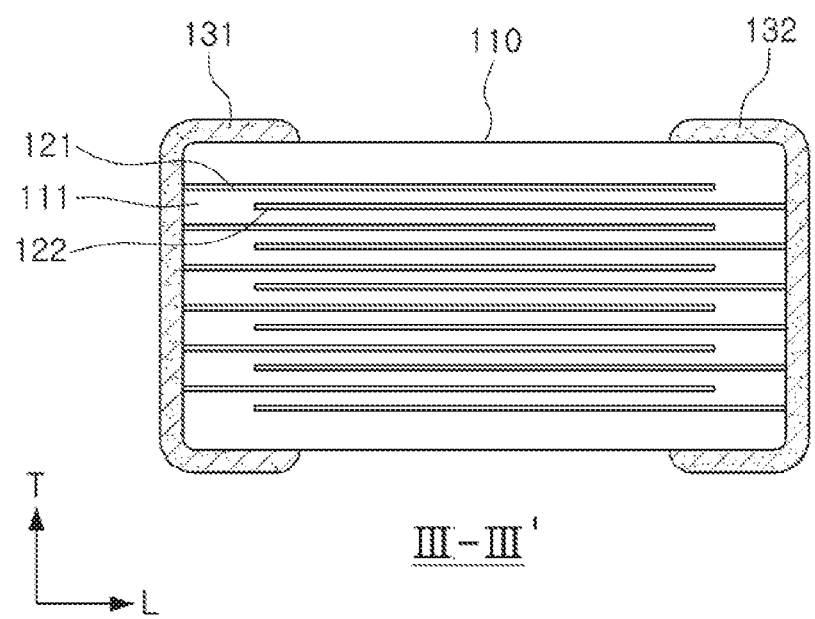
FIG. 3 is a schematic cross-sectional view illustrating the multilayer ceramic capacitor taken along line of FIG. 2.

FIG. 2 is a schematic perspective view illustrating a multilayer ceramic capacitor 100 according to an exemplary embodiment, and FIG. 3 is a schematic cross-sectional view illustrating the multilayer ceramic capacitor 100 taken along the line of FIG. 2.

Referring to FIGS. 2 and 3, the multilayer ceramic capacitor 100 according to an exemplary embodiment may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but generally may be a hexahedral shape. In addition, dimensions of the ceramic body 110 are not particularly limited, and the ceramic body 110 may have a suitable dimension depending on the use. For example, the ceramic body 110 may have dimensions of (0.6~5.6 mm)×(0.3~5.0 mm)×(0.3~1.9 mm).

A thickness of the dielectric layer 111 may be optionally changed according to a capacitance design of the capacitor. According to the exemplary embodiment, a thickness of a single dielectric layer after sintering may be preferably 0.1 μm or more.

In a case in which the dielectric layer has an excessively low thickness, the number of crystal grains present in the single dielectric layer is small (e.g., the number of crystal grains in a thickness of the dielectric layer between two adjacent internal electrodes 121 and 122), which has a negative influence on reliability. Therefore, the thickness of the dielectric layer may be 0.1 μm or more.

The first and second internal electrodes 121 and 122 may be stacked so that end surfaces thereof are alternately exposed to respective surfaces of both end portions of the ceramic body 110 opposing each other.

The first and second external electrodes 131 and 132 may be formed on respective end portions of the ceramic body 110 and respectively electrically connected to the exposed end surfaces of the first and second internal electrodes 121 and 122 that are alternately disposed, thereby configuring a capacitor circuit.

A conductive material contained in the first and second internal electrodes 121 and 122 is not particularly limited, but the dielectric layer 111 according to the exemplary embodiment may be formed using the dielectric ceramic composition according to the exemplary embodiment.

The dielectric ceramic composition according to the exemplary embodiment may contain the first main ingredient of $BaTiO_3$ and the second main ingredient of $BaTi_2O_5$, wherein the base material powder containing the first and second main ingredients is represented by $(1-x)BaTiO_3-xBaTi_2O_5$, and x satisfies $0.1 \leq x \leq 0.8$.

A thickness of the first and second internal electrodes 121 and 122 may be appropriately determined depending on the intended application or use of the capacitor, but is not particularly limited. For example, the thickness of the first and second internal electrodes 121 and 122 may be 0.1 to 5 μm or 0.1 to 2.5 μm.

A conductive material contained in the first and second external electrodes 131 and 132 is not particularly limited, but Ni, Cu, or alloys thereof may be used.

A thickness of the first and second external electrodes 131 and 132 may be appropriately determined depending on the intended application or use, but is not particularly limited. For example, the thickness of the first and second external electrodes 131 and 132 may be 10 to 50 μm.

Hereinafter, the capacitor and dielectric ceramic composition will be described in more detail through Inventive Examples and Comparative Examples, but these are merely to help in a specific understanding of the present disclosure. Therefore, the scope of the present disclosure is not limited to Inventive Examples.

After compositions containing ingredients illustrated in the following Tables 1, 3, and 5 were each mixed with a dispersant using ethanol and toluene as solvents, a binder was mixed with each of the mixtures, thereby manufacturing ceramic sheets.

As a main ingredient base material, $BaTiO_3$ and $BaTi_2O_5$ powders having an average particle size of 300 nm were used.

An active sheet was manufactured by printing a Ni electrode on the formed ceramic sheet and stacking 21 ceramic sheets on which the Ni electrode was printed, and covers positioned on and below the active sheet were manufactured by stacking 25 cover sheets (10-13 μm).

Thereafter, the active sheet and the covers were compressed, thereby manufacturing a compressed bar.

Then, the compressed bar was cut into chips having a size of 3.2 mm×1.6 mm using a cutter.

After the cut chip was calcined in order to remove the binder, the calcined chip was sintered at 1200° C. under a reduction atmosphere (1.0% of H2/99% of $N_2$, $H_2O/H_2/N_2$ atmosphere), and external electrodes were formed on the sintered chip using a Cu paste.

Room-temperature capacitance and dissipation factors (DFs) of prototype multilayer ceramic capacitor (MLCC) samples completed as described above were measured at 1 kHz and AC 0.2V/μm using an LCR-meter.

Permittivity of a dielectric material of the multilayer ceramic capacitor (MLCC) was calculated from the measured capacitance, a thickness of a dielectric layer, an area of internal electrodes, and the number of stacked dielectric layers of the multilayer ceramic capacitor.

Room-temperature insulation resistance (IR) was measured after 60 seconds in a state in which ten samples each were taken and DC 10V/μm was applied thereto.

The temperature coefficient of capacitance (TCC) was measured in a temperature range from −55 to 200° C.

In a high-temperature IR boosting test, a resistance degradation behavior was measured while increasing a voltage step by 5V/μm at 200° C., wherein the time of each step was 10 minutes and the resistance value was measured every 5 seconds.

A high-temperature withstand voltage was derived from the high-temperature IR boosting test. Here, the high-temperature withstand voltage means a voltage at which an IR withstands 105Ω or more when the high-temperature withstand voltage is measured by applying a voltage step of DC 5V/μm per a unit thickness of the dielectric layer at 200° C. for 10 minutes and continuously increasing the voltage step.

An RC value is a product of a room-temperature capacitance value measured at AC 0.2V/μm and 1 kHz and an insulation resistance value measured at DC 10V/μm.

Tables 2, 4, and 6 indicate characteristics of prototype multilayer ceramic capacitors (MLCCs) to which Ni internal electrodes corresponding to compositions illustrated in Tables 1, 3, and 5 were applied.

TABLE 1

| Inventive Example | Molar Ratio of Each Ingredient of Base Material $(1-x)BaTiO_3 + xBaTi_2O_5$ | | Content (mol) of Each Additive Based on 100 mol of Base Material | | | | | |
|---|---|---|---|---|---|---|---|---|
| | First Main Ingredient $BaTiO_3$ $(1-x)$ | Second Main Ingredient $BaTi_2O_5$ $(x)$ | First Accessory Ingredient $MnO_2$ | First Accessory Ingredient $V_2O_5$ | Second Accessory Ingredient $BaCO_3$ | Third Accessory Ingredient $SiO_2$ | Fourth Accessory Ingredient $Y_2O_3$ | Fourth Accessory Ingredient $Dy_2O_3$ | Fifth Accessory Ingredient $MgCO_3$ |
| 1 | 1.000 | 0.000 | 0.500 | 0.000 | 1.00 | 1.00 | 0.00 | 0.00 | 0.00 |
| 2 | 0.950 | 0.050 | 0.500 | 0.000 | 1.00 | 1.00 | 0.00 | 0.00 | 0.00 |
| 3 | 0.900 | 0.100 | 0.500 | 0.000 | 1.00 | 1.00 | 0.00 | 0.00 | 0.00 |
| 4 | 0.800 | 0.200 | 0.500 | 0.000 | 1.00 | 1.00 | 0.00 | 0.00 | 0.00 |
| 5 | 0.700 | 0.300 | 0.500 | 0.000 | 1.00 | 1.00 | 0.00 | 0.00 | 0.00 |
| 6 | 0.600 | 0.400 | 0.500 | 0.000 | 1.00 | 1.00 | 0.00 | 0.00 | 0.00 |
| 7 | 0.500 | 0.500 | 0.500 | 0.000 | 1.00 | 1.00 | 0.00 | 0.00 | 0.00 |
| 8 | 0.400 | 0.600 | 0.500 | 0.000 | 1.00 | 1.00 | 0.00 | 0.00 | 0.00 |
| 9 | 0.300 | 0.700 | 0.500 | 0.000 | 1.00 | 1.00 | 0.00 | 0.00 | 0.00 |
| 10 | 0.200 | 0.800 | 0.500 | 0.000 | 1.00 | 1.00 | 0.00 | 0.00 | 0.00 |
| 11 | 0.100 | 0.900 | 0.500 | 0.000 | 1.00 | 1.00 | 0.00 | 0.00 | 0.00 |
| 12 | 0.000 | 1.000 | 0.500 | 0.000 | 1.00 | 1.00 | 0.00 | 0.00 | 0.00 |

TABLE 2

(Permittivity/DF Measurement Conditions: AC 0.2 V/um, 1 kHz, Room-Temperature Specific Resistance: DC 10 V/um)
First Crystal Grain: Crystal Grain Having Ti/Ba content (at %) ratio less than 1.5,
Second Crystal Grain: Crystal Grain Having Ti/Ba content (at %) ratio of 1.5 to 2.5
(Analyzed using STEM/EPMA or STEM/EELS)

| Inventive Example | Area Ratio of First Crystal Grain (1 − y) | Area Ratio of Second Crystal Grain (y) | Room-Temperature Permittivity | DF % | Room-Temperature Specific Resistance (Ohm-cm) | TCC (%) (−55° C.) | TCC (%) (150° C.) | TCC (%) (200° C.) | High-Temperature (200° C.) Withstand Voltage (V/um)* | Judgment |
|---|---|---|---|---|---|---|---|---|---|---|
| 1 | 100.0% | 0.0% | 3042.0 | 4.12 | 6.654E+12 | 4.5% | −22.8% | −32.6% | 60 | X |
| 2 | 96.4% | 3.6% | 2315.0 | 3.36 | 7.990E+12 | 4.2% | −20.4% | −28.7% | 60 | X |
| 3 | 90.5% | 9.5% | 1950.0 | 2.84 | 7.248E+12 | 4.2% | −14.8% | −22.4% | 60 | ○ |
| 4 | 82.3% | 17.7% | 1450.0 | 1.87 | 1.078E+13 | 3.7% | −13.4% | −19.5% | 60 | ○ |
| 5 | 70.5% | 29.5% | 1123.0 | 1.75 | 2.576E+13 | 1.8% | −10.5% | −18.7% | 65 | ○ |
| 6 | 58.7% | 41.3% | 812.0 | 1.62 | 3.453E+13 | 0.2% | −8.4% | −14.5% | 65 | ○ |
| 7 | 47.4% | 52.6% | 523.0 | 1.56 | 6.741E+12 | −1.1% | −6.8% | −12.4% | 65 | ○ |
| 8 | 41.3% | 58.7% | 334.0 | 1.68 | 6.564E+12 | −2.3% | −2.4% | −8.4% | 60 | ○ |
| 9 | 29.2% | 70.8% | 257.0 | 1.45 | 9.486E+12 | −3.6% | −2.2% | −6.8% | 60 | ○ |
| 10 | 18.6% | 81.4% | 185.0 | 1.84 | 5.534E+12 | −3.6% | 0.4% | 1.5% | 55 | ○ |
| 11 | 10.5% | 89.5% | 95.0 | 15.80 | 3.556E+09 | −3.6% | 3.3% | 10.4% | 25 | X |
| 12 | 0.0% | 100.0% | 84.0 | 20.40 | 2.486E+08 | −3.6% | 8.4% | 16.8% | 20 | X |

Inventive Examples 1 to 12 shown in Table 1 are Inventive Examples having different values of x when a content of a first accessory ingredient ($MnO_2$) is 0.5 mol, a content of a second accessory ingredient ($BaCO_3$) is 1.0 mol, and a content of a third accessory ingredient ($SiO_2$) is 1.0 mol based on 100 mol of a base material powder ($(1-x)BaTiO_3-xBaTi_2O_5$). Table 2 reports characteristics of prototype multilayer ceramic capacitors (MLCCs) including dielectric layers manufactured using the dielectric ceramic compositions of Inventive Examples 1 to 12 in Table 1, having Ni internal electrodes, and having been sintered under a reduction atmosphere.

In cases (Inventive Examples 1 and 2) in which a composition ratio x of $BaTi_2O_5$ was less than 0.05, high-temperature (150° C.) TCC exceeded ±15%, and in cases (Inventive Examples 11 and 12) in which the composition ratio x of $BaTi_2O_5$ was excessively high (0.9 or more), room-temperature specific resistance was decreased to be less than 1E11 Ohm-cm and a high-temperature (200° C.) withstand voltage was decreased to be less than 50V/μm.

In cases (Inventive Examples 3 to 10) in which the composition ratio x of $BaTi_2O_5$ was in a range of 0.1 to 0.8, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

In a case of manufacturing the dielectric layer by sintering the dielectric ceramic composition according to the exemplary embodiment at 1200° C. under a reduction atmosphere (1.0% of $H_2$/99% of $N_2$, $H_2O/H_2/N_2$ atmosphere) or manufacturing the multilayer ceramic capacitor by printing the Ni internal electrode on the dielectric layer, a microstructure of dielectric layer may include a first crystal grain and a second crystal grain.

Contents of Ba and Ta at a total of four points, P1 to P4 in a single crystal grain were analyzed using scanning transmission electron microscopy (STEM)/wavelength dispersive X-ray spectroscopy (WDS) or STEM/electron energy loss spectroscopy (EELS).

As a result of calculating average values of the contents of Ba and Ti at the four points, the first crystal grain was defined as a crystal grain satisfying "Ti/Ba content ratio <1.5" and the second crystal grain was defined as a crystal grain satisfying "1.5≤Ti/Ba content ratio ≤2.5".

Referring to Inventive Examples 1 to 12 in Table 1, it may be appreciated that in order to achieve the desired characteristics, the dielectric layer of the multilayer ceramic capacitor includes the first and second crystal grains, and an area ratio of the second crystal grain to a total area is 9.5% to 81.4%.

That is, in a case in which an area ratio of a second crystal grain per unit area is 9.5% to 81.4% at the time of observing a microstructure of a dielectric layer of a multilayer ceramic capacitor, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, may be simultaneously provided.

TABLE 3

| Inventive Example | Molar Ratio of Each Ingredient of Base Material $(1 − x)BaTiO_3 + xBaTi_2O_5$ | | Content (mol) of Each Additive Based on 100 mol of Base Material | | | | | | |
|---|---|---|---|---|---|---|---|---|---|
| | First Main Ingredient $BaTiO_3$ (1 − x) | Second Main Ingredient $BaTi_2O_5$ (x) | First Accessory Ingredient $MnO_2$ | | Second Accessory Ingredient $BaCO_3$ | Third Accessory Ingredient $SiO_2$ | Fourth Accessory Ingredient | | Fifth Accessory Ingredient $MgCO_3$ |
| | | | $MnO_2$ | $V_2O_5$ | $BaCO_3$ | $SiO_2$ | $Y_2O_3$ | $Dy_2O_3$ | $MgCO_3$ |
| 13 | 0.500 | 0.500 | 0.000 | 0.000 | 1.00 | 1.00 | 0.00 | 0.00 | 0.00 |
| 14 | 0.500 | 0.500 | 0.200 | 0.000 | 1.00 | 1.00 | 0.00 | 0.00 | 0.00 |
| 15 | 0.500 | 0.500 | 0.500 | 0.000 | 1.00 | 1.00 | 0.00 | 0.00 | 0.00 |

TABLE 3-continued

| | Molar Ratio of Each Ingredient of Base Material $(1-x)BaTiO_3 + xBaTi_2O_5$ | | Content (mol) of Each Additive Based on 100 mol of Base Material | | | | | | |
|---|---|---|---|---|---|---|---|---|---|
| | First Main Ingredient $BaTiO_3$ | Second Main Ingredient $BaTi_2O_5$ | First Accessory Ingredient | | Second Accessory Ingredient | Third Accessory Ingredient | Fourth Accessory Ingredient | | Fifth Accessory Ingredient |
| Inventive Example | $(1-x)$ | $(x)$ | $MnO_2$ | $V_2O_5$ | $BaCO_3$ | $SiO_2$ | $Y_2O_3$ | $Dy_2O_3$ | $MgCO_3$ |
| 16 | 0.500 | 0.500 | 1.000 | 0.000 | 1.00 | 1.00 | 0.00 | 0.00 | 0.00 |
| 17 | 0.500 | 0.500 | 2.000 | 0.000 | 1.00 | 1.00 | 0.00 | 0.00 | 0.00 |
| 18 | 0.500 | 0.500 | 3.000 | 0.000 | 1.00 | 1.00 | 0.00 | 0.00 | 0.00 |
| 19 | 0.500 | 0.500 | 5.000 | 0.000 | 1.00 | 1.00 | 0.00 | 0.00 | 0.00 |
| 20 | 0.500 | 0.500 | 8.000 | 0.000 | 1.00 | 1.00 | 0.00 | 0.00 | 0.00 |
| 21 | 0.500 | 0.500 | 0.250 | 0.125 | 1.00 | 1.00 | 0.00 | 0.00 | 0.00 |
| 22 | 0.500 | 0.500 | 2.500 | 1.250 | 1.00 | 1.00 | 0.00 | 0.00 | 0.00 |
| 23 | 0.500 | 0.500 | 4.000 | 2.000 | 1.00 | 1.00 | 0.00 | 0.00 | 0.00 |
| 24 | 0.500 | 0.500 | 0.500 | 0.000 | 0.00 | 1.00 | 0.00 | 0.00 | 0.00 |
| 25 | 0.500 | 0.500 | 0.500 | 0.000 | 0.20 | 1.00 | 0.00 | 0.00 | 0.00 |
| 26 | 0.500 | 0.500 | 0.500 | 0.000 | 0.50 | 1.00 | 0.00 | 0.00 | 0.00 |
| 27 | 0.500 | 0.500 | 0.500 | 0.000 | 1.00 | 1.00 | 0.00 | 0.00 | 0.00 |
| 28 | 0.500 | 0.500 | 0.500 | 0.000 | 2.00 | 1.00 | 0.00 | 0.00 | 0.00 |
| 29 | 0.500 | 0.500 | 0.500 | 0.000 | 3.00 | 1.00 | 0.00 | 0.00 | 0.00 |
| 30 | 0.500 | 0.500 | 0.500 | 0.000 | 5.00 | 1.00 | 0.00 | 0.00 | 0.00 |
| 31 | 0.500 | 0.500 | 0.500 | 0.000 | 10.00 | 1.00 | 0.00 | 0.00 | 0.00 |
| 32 | 0.500 | 0.500 | 0.500 | 0.000 | 15.00 | 1.00 | 0.00 | 0.00 | 0.00 |
| 33 | 0.500 | 0.500 | 0.500 | 0.000 | 1.00 | 0.00 | 0.00 | 0.00 | 0.00 |
| 34 | 0.500 | 0.500 | 0.500 | 0.000 | 1.00 | 0.10 | 0.00 | 0.00 | 0.00 |
| 35 | 0.500 | 0.500 | 0.500 | 0.000 | 1.00 | 0.20 | 0.00 | 0.00 | 0.00 |
| 36 | 0.500 | 0.500 | 0.500 | 0.000 | 1.00 | 0.50 | 0.00 | 0.00 | 0.00 |
| 37 | 0.500 | 0.500 | 0.500 | 0.000 | 1.00 | 2.00 | 0.00 | 0.00 | 0.00 |
| 38 | 0.500 | 0.500 | 0.500 | 0.000 | 1.00 | 5.00 | 0.00 | 0.00 | 0.00 |
| 39 | 0.500 | 0.500 | 0.500 | 0.000 | 1.00 | 7.00 | 0.00 | 0.00 | 0.00 |

TABLE 4

(Permittivity/DF Measurement Conditions: AC 0.2 V/um, 1 kHz, Room-Temperature Specific Resistance: DC 10 V/um)
First Crystal Grain: Crystal Grain Having Ti/Ba content (at %) ratio less than 1.5,
Second Crystal Grain: Crystal Grain Having Ti/Ba content (at %) ratio of 1.5 to 2.5
(Analyzed using STEM/EPMA or STEM/EELS)

| Inventive Example | Area Ratio of First Crystal Grain $(1-y)$ | Area Ratio of Second Crystal Grain $(y)$ | Room-Temperature Permittivity | DF (%) | Room-Temperature Specific Resistance (Ohm-cm) | TCC (%) (−55° C.) | TCC (%) (150° C.) | TCC (%) (200° C.) | High-Temperature (200° C.) Withstand Voltage (V/um)* | Judgment |
|---|---|---|---|---|---|---|---|---|---|---|
| 13 | 49.6% | 50.4% | 542.7 | 2.15 | 6.382E+09 | −1.7% | −4.5% | −14.2% | 30 | X |
| 14 | 51.5% | 48.5% | 512.8 | 1.68 | 1.685E+12 | −1.5% | −5.9% | −13.4% | 55 | ○ |
| 15 | 47.4% | 52.6% | 523.0 | 1.56 | 6.741E+12 | −1.1% | −6.8% | −12.4% | 65 | ○ |
| 16 | 48.6% | 51.4% | 486.0 | 1.41 | 1.123E+13 | −0.6% | −5.5% | −12.6% | 60 | ○ |
| 17 | 49.7% | 50.3% | 472.0 | 1.38 | 4.335E+12 | −0.5% | −4.8% | −11.7% | 60 | ○ |
| 18 | 50.3% | 49.7% | 421.0 | 1.25 | 1.248E+12 | −1.1% | −5.2% | −11.6% | 55 | ○ |
| 19 | 49.1% | 50.9% | 397.0 | 1.12 | 8.652E+11 | −1.2% | −3.9% | −10.8% | 55 | ○ |
| 20 | 49.8% | 50.2% | 324.0 | 1.11 | 7.652E+10 | −0.8% | −2.4% | −9.8% | 45 | X |
| 21 | 48.3% | 51.7% | 507.0 | 1.68 | 8.875E+12 | −1.5% | −7.4% | −13.8% | 65 | ○ |
| 22 | 49.4% | 50.6% | 412.0 | 1.34 | 7.568E+11 | −1.7% | −4.4% | −11.3% | 55 | ○ |
| 23 | 50.8% | 49.2% | 346.0 | 1.23 | 4.123E+10 | −0.5% | −1.7% | −9.3% | 40 | X |
| 24 | 48.8% | 51.2% | 413.0 | 3.86 | 3.589E+10 | 0.6% | −4.5% | −14.7% | 45 | X |
| 25 | 49.3% | 50.7% | 511.0 | 1.76 | 1.128E+12 | 0.7% | −4.6% | −14.2% | 50 | ○ |
| 26 | 50.2% | 49.8% | 523.0 | 1.89 | 3.015E+12 | 0.4% | −4.8% | −14.4% | 55 | ○ |
| 27 | 49.7% | 50.3% | 517.0 | 1.81 | 8.453E+12 | 0.2% | −5.5% | −13.8% | 55 | ○ |
| 28 | 51.6% | 48.4% | 507.0 | 1.85 | 9.568E+12 | 0.7% | −4.7% | −13.9% | 55 | ○ |
| 29 | 50.5% | 49.5% | 509.0 | 1.78 | 8.853E+11 | 0.6% | −5.1% | −14.1% | 55 | ○ |
| 30 | 46.8% | 53.2% | 494.0 | 1.57 | 7.271E+11 | 0.4% | −4.6% | −14.2% | 55 | ○ |
| 31 | 47.3% | 52.7% | 489.0 | 1.24 | 6.384E+11 | 0.7% | −3.5% | −13.5% | 50 | ○ |
| 32 | 51.5% | 48.5% | 327.0 | 23.70 | 8.854E+08 | — | — | — | 15 | X |
| 33 | 50.3% | 49.7% | 384.0 | 12.50 | 9.470E+08 | — | — | — | 10 | X |
| 34 | 49.6% | 50.4% | 412.0 | 4.23 | 8.460E+09 | — | — | — | 20 | X |
| 35 | 47.4% | 52.6% | 497.0 | 1.97 | 1.267E+11 | 0.4% | −2.8% | −12.6% | 50 | ○ |
| 36 | 48.3% | 51.7% | 517.0 | 1.56 | 1.023E+12 | 0.2% | −3.5% | −13.2% | 60 | ○ |
| 37 | 50.5% | 49.5% | 536.0 | 1.42 | 9.853E+11 | −0.4% | −3.8% | −13.8% | 55 | ○ |
| 38 | 51.8% | 48.2% | 548.0 | 1.38 | 8.840E+11 | −1.1% | −4.4% | −13.5% | 50 | ○ |
| 39 | 50.0% | 50.0% | 503.0 | 1.27 | 7.120E+11 | −1.4% | −4.8% | −13.9% | 40 | X |

Inventive Examples 13 to 20 shown in Table 3 are Inventive Examples in which content of a first accessory ingredient ($MnO_2$) is varied when a content of a second accessory ingredient ($BaCO_3$) was 1.0 mol and a content of a third accessory ingredient ($SiO_2$) was 1.0 mol based on 100 mol of a base material powder ($0.5BaTiO_3$-$0.5BaTi_2O_5$). Table 4 reports characteristics of prototype multilayer ceramic capacitors (MLCCs) including dielectric layers manufactured using the dielectric ceramic compositions of Inventive Examples 13 to 20 in Table 3, having Ni internal electrodes, and having been sintered under a reduction atmosphere.

In a case (Inventive Example 13) in which the first accessory ingredient ($MnO_2$) was not added, a high-temperature withstand voltage was decreased to be less than 50V/μm. Further, in a case (Inventive Example 20) in which the content of the added first accessory ingredient ($MnO_2$) was excessively high (e.g., 8 mol based on 100 mol of the base material powder), the high-temperature withstand voltage was also decreased to be less than 50V/μm.

That is, in cases (Inventive Examples 14 to 19) in which the content of the first accessory ingredient ($MnO_2$) was 0.2 mol to 5.0 mol based on 100 mol of the base material powder, the multilayer ceramic capacitor exhibited excellent characteristics including the high-temperature (200° C.) withstand voltage of 50V/μm or more.

Inventive Examples 21 to 23 in Table 3 are Inventive Examples in which the dielectric ceramic composition contained both $MnO_2$ and $V_2O_5$ as the first accessory ingredient, and Table 4 reports characteristics of prototype multilayer ceramic capacitors (MLCCs) including dielectric layers manufactured using the dielectric ceramic compositions of Inventive Examples 21 to 23 of Table 3, having Ni internal electrodes, and having been sintered under a reduction atmosphere.

It may be appreciated that even though the dielectric ceramic composition contained only $MnO_2$ as the first accessory ingredient (Inventive Examples 15 and 19), or contained both $MnO_2$ and $V_2O_5$ as the first accessory ingredient (Inventive Examples 21 and 22), when a sum of contents (at %) of Mn and V atoms contained as the first accessory ingredient was the same, similar characteristics were provided.

That is, it may be appreciated that in a case (Inventive Example 15) in which only Mn was contained at a content of 0.5 at % and a case (Inventive Example 21) in which both Mn and V were contained and a sum of contents of Mn and V was 0.5 at % (Mn: 0.25 at %, V: 0.25 at %), characteristics were similar to each other.

Further, it may be appreciated that in a case (Inventive Example 19) in which only Mn was contained at a content of 5.0 at % and a case (Inventive Example 22) in which both Mn and V were contained and a sum of the contents of Mn and V was 5.0 at % (Mn: 2.5 at %, V: 2.5 at %), characteristics were similar to each other.

In cases (Inventive Examples 14 to 19, 21, and 22) in which a total content (based on at %) of variable valence acceptors contained as the first accessory ingredient was 0.2 to 5.0 at %, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

It may be appreciated that in this case, the area ratio of the second crystal grain to the total area was also in a range of 9.5% to 81.4%.

Inventive Examples 24 to 32 in Table 3 are Inventive Examples in which content of the second accessory ingredient ($BaCO_3$) is varied while the content of the first accessory ingredient ($MnO_2$) is 0.5 mol and the content of the third accessory ingredient ($SiO_2$) is 1.0 mol based on 100 mol of the base material powder ($0.5BaTiO_3$-$0.5BaTi_2O_5$). Table 4 reports characteristics of prototype multilayer ceramic capacitors (MLCCs) including dielectric layers manufactured using the dielectric ceramic compositions of Inventive Examples 24 to 32, having Ni internal electrodes, and having been sintered under a reduction atmosphere.

In a case (Inventive Example 24) in which the second accessory ingredient ($BaCO_3$) was not added or a case (Inventive Example 32) in which the content of the added second accessory ingredient ($BaCO_3$) was excessively high (15 mol or so) based on 100 mol of the base material powder, a sintering density was low, such that high-temperature withstand voltage was decreased to be less than 50V/μm.

However, in cases (Inventive Examples 25 to 31) in which the content of the second accessory ingredient ($BaCO_3$) was 0.2 mol to 10 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

It may be appreciated that in this case, the area ratio of the second crystal grain to the total area was also in a range of 9.5% to 81.4%.

Inventive Examples 33 to 39 shown in Table 3 are Inventive Examples in which content of the third accessory ingredient ($SiO_2$) is varied when the content of the first accessory ingredient ($MnO_2$) is 0.5 mol and the content of the second accessory ingredient ($BaCO_3$) is 1.0 mol based on 100 mol of the base material powder ($0.5BaTiO_3$-$0.5BaTi_2O_5$). Table 4 reports characteristics of prototype multilayer ceramic capacitors (MLCCs) including dielectric layers manufactured using the dielectric ceramic compositions of Inventive Examples 33 to 39, having Ni internal electrodes, and having been sintered under a reduction atmosphere.

In cases (Inventive Examples 33 and 34) in which the content of the third accessory ingredient ($SiO_2$) was 0.1 mol or less based on 100 mol of the base material powder, the sintering density was low, such that the high-temperature withstand voltage was decreased to be less than 50V/μm. Furthermore, in a case (Inventive Example 39) in which the content of the added third accessory ingredient ($SiO_2$) was excessively high (7.0 mol or so) based on 100 mol of the base material powder, the high-temperature withstand voltage was decreased to be less than 50V/μm due to formation of a secondary phase, and the like.

However, in cases (Inventive Examples 35 to 38) in which the content of the third accessory ingredient ($SiO_2$) was 0.2 mol to 5.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

It may be appreciated that in this case, the area ratio of the second crystal grain to the total area was also in a range of 9.5% to 81.4%.

TABLE 5

| Inventive Example | Molar Ratio of Each Ingredient of Base Material $(1-x)BaTiO_3 + xBaTi_2O_5$ | | Content (mol) of Each Additive Based on 100 mol of Base Material | | | | | | |
|---|---|---|---|---|---|---|---|---|---|
| | First Main Ingredient $BaTiO_3$ | Second Main Ingredient $BaTi_2O_5$ | First Accessory Ingredient | | Second Accessory Ingredient | Third Accessory Ingredient | Fourth Accessory Ingredient | | Fifth Accessory Ingredient |
| | $(1-x)$ | $(x)$ | $MnO_2$ | $V_2O_5$ | $BaCO_3$ | $SiO_2$ | $Y_2O_3$ | $Dy_2O_3$ | $MgCO_3$ |
| 40 | 0.500 | 0.500 | 0.500 | 0.000 | 1.00 | 1.00 | 0.25 | 0.00 | 0.00 |
| 41 | 0.500 | 0.500 | 0.500 | 0.000 | 1.00 | 1.00 | 0.50 | 0.00 | 0.00 |
| 42 | 0.500 | 0.500 | 0.500 | 0.000 | 1.00 | 1.00 | 1.00 | 0.00 | 0.00 |
| 43 | 0.500 | 0.500 | 0.500 | 0.000 | 1.00 | 1.00 | 2.00 | 0.00 | 0.00 |
| 44 | 0.500 | 0.500 | 0.500 | 0.000 | 1.00 | 1.00 | 3.00 | 0.00 | 0.00 |
| 45 | 0.500 | 0.500 | 0.500 | 0.000 | 1.00 | 1.00 | 5.00 | 0.00 | 0.00 |
| 46 | 0.500 | 0.500 | 0.500 | 0.000 | 1.00 | 1.00 | 7.00 | 0.00 | 0.00 |
| 47 | 0.500 | 0.500 | 0.500 | 0.000 | 1.00 | 1.00 | 0.00 | 1.00 | 0.00 |
| 48 | 0.500 | 0.500 | 0.500 | 0.000 | 1.00 | 1.00 | 0.00 | 5.00 | 0.00 |
| 49 | 0.500 | 0.500 | 0.500 | 0.000 | 1.00 | 1.00 | 0.00 | 7.00 | 0.00 |
| 50 | 0.500 | 0.500 | 0.500 | 0.000 | 1.00 | 1.00 | 2.00 | 0.00 | 0.50 |
| 51 | 0.500 | 0.500 | 0.500 | 0.000 | 1.00 | 1.00 | 2.00 | 0.00 | 1.00 |
| 52 | 0.500 | 0.500 | 0.500 | 0.000 | 1.00 | 1.00 | 2.00 | 0.00 | 2.00 |
| 53 | 0.500 | 0.500 | 0.500 | 0.000 | 1.00 | 1.00 | 2.00 | 0.00 | 3.00 |
| 54 | 0.500 | 0.500 | 0.500 | 0.000 | 1.00 | 1.00 | 2.00 | 0.00 | 5.00 |
| 55 | 0.500 | 0.500 | 0.500 | 0.000 | 1.00 | 1.00 | 2.00 | 0.00 | 7.00 |

TABLE 6

(Permittivity/DF Measurement Conditions: AC 0.2 V/um, 1 kHz, Room-Temperature Specific Resistance: DC 10 V/um)
First Crystal Grain: Crystal Grain Having Ti/Ba content (at %) ratio less than 1.5,
Second Crystal Grain: Crystal Grain Having Ti/Ba content (at %) ratio of 1.5 to 2.5
(Analyzed using STEM/EPMA or STEM/EELS)

| Inventive Example | Area Ratio of First Crystal Grain $(1-y)$ | Area Ratio of Second Crystal Grain $(y)$ | Room-Temperature Permittivity | DF (%) | Room-Temperature Specific Resistance (Ohm-cm) | TCC (%) (−55° C.) | TCC (%) (150° C.) | TCC (%) (200° C.) | High-Temperature (200° C.) Withstand Voltage (V/um)* | Judgment |
|---|---|---|---|---|---|---|---|---|---|---|
| 40 | 47.4% | 52.6% | 523.0 | 1.56 | 6.741E+12 | −1.1% | −4.2% | −13.6% | 70 | ○ |
| 41 | 48.6% | 51.4% | 514.0 | 1.46 | 1.128E+13 | −2.4% | −3.9% | −13.4% | 75 | ○ |
| 42 | 49.3% | 50.7% | 507.0 | 1.48 | 1.015E+13 | −2.6% | −3.7% | −13.2% | 80 | ○ |
| 43 | 51.5% | 48.5% | 499.0 | 1.38 | 8.453E+11 | −3.2% | −3.5% | −12.9% | 75 | ○ |
| 44 | 50.3% | 49.7% | 481.0 | 1.47 | 9.568E+11 | −3.5% | −3.4% | −12.7% | 70 | ○ |
| 45 | 49.6% | 50.4% | 464.0 | 1.28 | 8.853E+11 | −4.1% | −3.2% | −12.4% | 65 | ○ |
| 46 | 48.8% | 51.2% | 420.0 | 1.55 | 7.271E+11 | −4.4% | −3.0% | −11.5% | 40 | X |
| 47 | 51.3% | 48.7% | 507.0 | 1.48 | 2.115E+13 | −2.4% | −3.7% | −13.8% | 80 | ○ |
| 48 | 51.4% | 48.6% | 464.0 | 1.28 | 6.853E+11 | −3.8% | −3.2% | −12.5% | 65 | ○ |
| 49 | 49.2% | 50.8% | 420.0 | 1.55 | 5.271E+11 | −4.2% | −3.0% | −11.7% | 40 | X |
| 50 | 50.3% | 49.7% | 511.0 | 1.45 | 2.384E+13 | −2.6% | −3.1% | −13.4% | 80 | ○ |
| 51 | 52.6% | 47.4% | 507.0 | 1.28 | 3.421E+13 | −2.4% | −3.1% | −13.6% | 80 | ○ |
| 52 | 47.2% | 52.8% | 503.0 | 1.35 | 4.470E+13 | −2.5% | −4.4% | −13.8% | 75 | ○ |
| 53 | 51.2% | 48.8% | 488.0 | 1.33 | 2.846E+13 | −2.6% | −5.2% | −14.1% | 70 | ○ |
| 54 | 51.0% | 49.0% | 425.0 | 1.28 | 1.267E+12 | −2.8% | −5.7% | −14.3% | 60 | ○ |
| 55 | 49.3% | 50.7% | 396.0 | 1.17 | 5.023E+11 | −3.0% | −6.8% | −15.9% | 40 | X |

Inventive Examples 40 to 46 shown in Table 5 are Inventive Examples in which content of a fourth accessory ingredient ($Y_2O_3$) was varied when the content of the first accessory ingredient ($MnO_2$) was 0.5 mol, the content of the second accessory ingredient ($BaCO_3$) was 1.0 mol, and the content of the third accessory ingredient ($SiO_2$) was 1.0 mol based on 100 mol of the base material powder (0.5$BaTiO_3$-0.5$BaTi_2O_5$). Table 6 reports characteristics of prototype multilayer ceramic capacitors (MLCCs) including dielectric layers manufactured using the dielectric ceramic compositions of Inventive Examples 40 to 46, having Ni internal electrodes, and having been sintered under a reduction atmosphere.

It may be appreciated that when $Y_2O_3$ was added as the fourth accessory ingredient, high-temperature withstand voltage characteristics were improved as compared to a case (Inventive Example 7) in which the fourth accessory ingredient ($Y_2O_3$) was not added. However, in a case (Inventive Example 46) in which the content of the added fourth accessory ingredient ($Y_2O_3$) was excessively high (7 mol) based on 100 mol of the base material powder, the high-temperature withstand voltage was decreased to be less than 50V/μm due to formation of a secondary phase.

Inventive Examples 47 to 49 in Table 5 are Inventive Examples in which a content of a fourth accessory ingredient ($Dy_2O_3$) is varied when the content of the first accessory ingredient ($MnO_2$) is 0.5 mol, the content of the second accessory ingredient ($BaCO_3$) is 1.0 mol, and the content of the third accessory ingredient ($SiO_2$) is 1.0 mol based on 100 mol of the base material powder ($0.5BaTiO_3$-$0.5BaTi_2O_5$). Table 6 reports characteristics of prototype multilayer ceramic capacitors (MLCCs) including dielectric layers manufactured using the dielectric ceramic compositions of Inventive Examples 47 to 49, having Ni internal electrodes, and having been sintered under a reduction atmosphere.

Comparing Inventive Examples 42 and 47, Inventive Examples 45 and 48, and Inventive Examples 46 and 49 with each other, it may be appreciated that when the contents of rare earth elements contained in the fourth accessory ingredient were equal to each other based on at %, similar characteristics were provided regardless of the kind of rare earth element.

That is, in cases (Inventive Examples 40 to 45, 47, and 48) in which the content of the fourth accessory ingredient was 0.25 mol to 5.0 mol based on 100 mol of the base material powder or the content (based on at %) of the rare earth element of the fourth accessory ingredient was 0.5 at % to 10 at %, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

It may be appreciated that in this case, the area ratio of the second crystal grain to the total area was also in a range of 9.5% to 81.4%.

Inventive Examples 50 to 55 in Table 5 are Inventive Examples in which a content of a fifth accessory ingredient ($MgCO_3$) is varied when the content of the first accessory ingredient ($MnO_2$) is 0.5 mol, the content of the second accessory ingredient ($BaCO_3$) is 1.0 mol, the content of the third accessory ingredient ($SiO_2$) is 1.0 mol, and the content of the fourth accessory ingredient ($Y_2O_3$) is 2.0 mol based on 100 mol of the base material powder ($0.5BaTiO_3$-$0.5BaTi_2O_5$). Table 6 reports characteristics of prototype multilayer ceramic capacitors (MLCCs) including dielectric layers manufactured using the dielectric ceramic compositions of Inventive Examples 50 to 55, having Ni internal electrodes, and having been sintered under a reduction atmosphere.

In cases in which the fifth accessory ingredient ($MgCO_3$) was added, a room-temperature specific resistance value was increased as compared to the case (inventive Example 7) in which the fifth accessory ingredient ($MgCO_3$) was not added. However, in a case (Inventive Example 55) in which the content of the added fifth accessory ingredient ($MgCO_3$) was excessively high (7 mol or so) based on 100 mol of the base material powder, the high-temperature withstand voltage was decreased to be less than 50V/μm due to formation of a secondary phase, and the like.

That is, in cases (Inventive Examples 50 to 54) in which the content of the fifth accessory ingredient ($MgCO_3$) was 0.5 mol to 5.0 mol based on 100 mol of the base material powder, all of the desired characteristics, that is room-temperature specific resistance of 1E11 Ohm-cm or more, high-temperature (200° C.) withstand voltage of 50V/μm or more, TCC (at 150° C.) less than ±15%, TCC (at 200° C.) less than ±22%, and room-temperature permittivity of 150 or more, were simultaneously provided.

It may be appreciated that in this case, the area ratio of the second crystal grain to the total area was also in a range of 9.5% to 81.4%.

As set forth above, with the dielectric ceramic composition, the multilayer ceramic capacitor containing the same, and the method for manufacturing a multilayer ceramic capacitor according to exemplary embodiments, all of the desired characteristics of the present disclosure, that is room-temperature specific resistance of 1E11 Ohm-cm or more, high-temperature (200° C.) withstand voltage of 50V/μm or more, TCC (at 1500) less than ±15%, TCC (at 200° C.) less than ±22%, and room-temperature permittivity of 150 or more, can be simultaneously provided.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising:
    a first main ingredient of $BaTiO_3$ and a second main ingredient of $BaTi_2O_5$; and
    a first accessory ingredient containing an oxide or carbonate of one or more variable valence acceptor elements selected from the group consisting of Manganese (Mn), vanadium (V), chromium (Cr), iron (Fe), nickel (Ni), cobalt (Co), copper (Cu), and zinc (Zn),
    wherein a base material powder containing the first and second main ingredients is represented by $(1-x)BaTiO_3$–$xBaTi_2O_5$, and x satisfies $0.1 \leq x \leq 0.8$, and
    wherein a sum of contents of the one or more variable valence acceptor elements contained in the first accessory ingredient is 0.2 at % to 5.0 at %.

2. The dielectric ceramic composition of claim 1, further comprising a second accessory ingredient,
    wherein the second accessory ingredient contains one or more selected from the group consisting of oxides and carbonates of Ba, and
    a content of the second accessory ingredient is 0.2 mol to 10.0 mol based on 100 mol of the base material powder.

3. The dielectric ceramic composition of claim 1, further comprising a third accessory ingredient,
    wherein the third accessory ingredient contains one or more selected from the group consisting of oxides of Si, carbonates of Si, and glass containing Si, and
    a content of the third accessory ingredient is 0.2 mol to 5.0 mol based on 100 mol of the base material powder.

4. The dielectric ceramic composition of claim 1, further comprising a fourth accessory ingredient,
    wherein the fourth accessory ingredient contains oxides or carbonates of one or more rare earth elements selected from the group consisting of Y, Dy, Ho, La, Ce, Nd, Sm, Gd, and Er, and
    a sum of contents of the one or more rare earth elements contained in the fourth accessory ingredient is 0.5 at % to 10.0 at %.

5. The dielectric ceramic composition of claim 1, further comprising a fifth accessory ingredient,
    wherein the fifth accessory ingredient contains one or more selected from the group consisting of oxides and carbonates of a fixed-valence acceptor element including Mg, and
    a content of the fifth accessory ingredient is 0.5 mol to 5.0 mol based on 100 mol of the base material powder.

6. A method for manufacturing a multilayer ceramic capacitor, the method comprising:
    manufacturing a plurality of ceramic sheets using a base material powder containing a first main ingredient of $BaTiO_3$ and a second main ingredient of $BaTi_2O_5$ and further containing a first accessory ingredient containing an oxide or carbonate of one or more variable valence acceptor elements selected from the group consisting of Manganese (Mn), vanadium (V), chromium (Cr), iron (Fe), nickel (Ni), cobalt (Co), copper (Cu), and zinc (Zn), wherein a sum of contents of the one or more variable valence acceptor elements contained in the first accessory ingredient is 0.2 at % to 5.0 at %;

printing an internal electrode on two or more of the ceramic sheets using a conductive paste, and stacking and compressing the ceramic sheets to manufacture a compressed bar;

cutting the compressed bar to manufacture a chip; and sintering the chip under a reduction atmosphere, wherein the base material powder is represented by $(1-x)BaTiO_3-xBaTi_2O_5$, and x satisfies $0.1 \leq x \leq 0.8$.

7. The method of claim 6, wherein the sintering of the chip is performed under 1.0% of $H_2$/99% of $N_2$ atmosphere.

8. The method of claim 6, wherein the sintering of the chip is performed at 1200° C.

9. A dielectric ceramic composition comprising:
a first crystal grain in which a Ti/Ba content ratio is less than 1.5, and a second crystal grain in which a Ti/Ba content ratio is 1.5 to 2.5; and
a first accessory ingredient containing an oxide or carbonate of one or more variable valence acceptor elements selected from the group consisting of Manganese (Mn), vanadium (V), chromium (Cr), iron (Fe), nickel (Ni), cobalt (Co), copper (Cu), and zinc (Zn),
wherein an area ratio of the second crystal grain to a total area is 9.5% to 81.4%, and
wherein a sum of contents of the one or more variable valence acceptor elements contained in the first accessory ingredient is 0.2 at % to 5.0 at %.

10. The dielectric ceramic composition of claim 9, wherein the dielectric ceramic composition contains a first main ingredient of $BaTiO_3$ and a second main ingredient of $BaTi_2O_5$, and
a base material powder containing the first and second main ingredients is represented by $(1-x)BaTiO_3-xBaTi_2O_5$, and x satisfies $0.1 \leq x \leq 0.8$.

11. The dielectric ceramic composition of claim 9, further comprising a second accessory ingredient,
wherein the second accessory ingredient contains one or more selected from the group consisting of oxides and carbonates of Ba, and
a content of the second accessory ingredient is 0.2 mol to 10.0 mol based on 100 mol of the base material powder.

12. The dielectric ceramic composition of claim 9, further comprising a third accessory ingredient,
wherein the third accessory ingredient contains one or more selected from the group consisting of oxides of Si, carbonates of Si, and glass containing Si, and
a content of the third accessory ingredient is 0.2 mol to 5.0 mol based on 100 mol of the base material powder.

13. The dielectric ceramic composition of claim 9, further comprising a fourth accessory ingredient,
wherein the fourth accessory ingredient contains oxides or carbonates of one or more rare earth elements selected from the group consisting of Y, Dy, Ho, La, Ce, Nd, Sm, Gd, and Er, and
a sum of contents of the one or more rare earth elements contained in the fourth accessory ingredient is 0.5 at % to 10.0 at %.

14. The dielectric ceramic composition of claim 9, further comprising a fifth accessory ingredient,
wherein the fifth accessory ingredient contains one or more selected from the group consisting of oxides and carbonates of a fixed-valence acceptor element including Mg, and
a content of the fifth accessory ingredient is 0.5 mol to 5.0 mol based on 100 mol of the base material powder.

15. A multilayer ceramic capacitor comprising:
a ceramic body including dielectric layers and internal electrodes; and
external electrodes disposed on an outer portion of the ceramic body and connected to the internal electrodes,
wherein the dielectric layers include the dielectric ceramic composition of claim 1.

16. The multilayer ceramic capacitor of claim 15, wherein the dielectric layers further comprise a second accessory ingredient containing one or more selected from the group consisting of oxides and carbonates of Ba, and
a content of the second accessory ingredient is 0.2 mol to 10.0 mol based on 100 mol of the base material powder.

17. The multilayer ceramic capacitor of claim 15, wherein the dielectric layers further comprise a third accessory ingredient containing one or more selected from the group consisting of oxides of Si, carbonates of Si, and glass containing Si, and
a content of the third accessory ingredient is 0.2 mol to 5.0 mol based on 100 mol of the base material powder.

18. The multilayer ceramic capacitor of claim 15, wherein the dielectric layers further comprise a fourth accessory ingredient containing oxides or carbonates of one or more rare earth elements selected from the group consisting of Y, Dy, Ho, La, Ce, Nd, Sm, Gd, and Er, and a sum of contents of the one or more rare earth elements contained in the fourth accessory ingredient is 0.5 at % to 10.0 at %.

19. The multilayer ceramic capacitor of claim 15, wherein the dielectric layers further comprise a fifth accessory ingredient containing one or more selected from the group consisting of oxides and carbonates of a fixed-valence acceptor element including Mg, and
a content of the fifth accessory ingredient is 0.5 mol to 5.0 mol based on 100 mol of the base material powder.

20. A multilayer ceramic capacitor comprising:
a ceramic body including dielectric layers and internal electrodes; and
external electrodes disposed on an outer portion of the ceramic body and connected to the internal electrodes,
wherein the dielectric layers include the dielectric ceramic composition of claim 9.

21. The multilayer ceramic capacitor of claim 20, wherein the dielectric layer contains a first main ingredient of $BaTiO_3$ and a second main ingredient of $BaTi_2O_5$, and
a base material powder containing the first and second main ingredients is represented by $(1-x)BaTiO_3-xBaTi_2O_5$, and x satisfies $0.1 \leq x \leq 0.8$.

22. The multilayer ceramic capacitor of claim 20, wherein the internal electrodes contain Ni.

23. The multilayer ceramic capacitor of claim 20, wherein the multilayer ceramic capacitor has room-temperature specific resistance of 1E11 Ohm-cm or more, high-temperature withstand voltage at 200° C. of 50V/μm or more, temperature coefficient of capacitance (TCC) at 150° C. less than +15%, TCC at 200° C. less than ±22%, and room-temperature permittivity of 150 or more.

* * * * *